United States Patent

[11] 3,604,768

| [72] | Inventor | Jacob Decker |
| | | Cincinnati, Ohio |
| [21] | Appl. No. | 856,102 |
| [22] | Filed | Sept. 8, 1969 |
| [45] | Patented | Sept. 14, 1971 |
| [73] | Assignee | Cincinnati Malacron Inc. |
| | | Cincinnati, Ohio |

[54] BEARING SHOE CONSTRUCTION
9 Claims, 3 Drawing Figs.

[52] U.S. Cl. .................................................. 308/73
[51] Int. Cl. .................................................. F16c 17/06
[50] Field of Search .......................................... 308/73

[56] References Cited
UNITED STATES PATENTS
2,758,892  3/1956  Wallgren ..................... 308/73
3,053,587  9/1962  Wallgren ..................... 308/73

FOREIGN PATENTS
252,939  6/1926  Great Britain ............... 308/73

*Primary Examiner*—Martin P. Schwadron
*Assistant Examiner*—Frank Susko
*Attorney*—Frank C. Leach, Jr.

ABSTRACT: Two bearing shoes, each of which has a wrap angle no greater than 60°, are connected to each other by a thin piece of spring steel to provide a resultant wrap angle of the connected bearing shoes on a spindle of preferably greater than 90°. The piece of spring steel bears against retaining surfaces on the two bearing shoes with the retaining surfaces being parallel to axes of the highest points of the arcs of the spindle contacting surfaces. Because of the flexibility of the spring steel, each of the bearing shoes can rock relative to the other. The bearing shoe, which is first passed by the spindle during its rotation, is fixed to the housing.

PATENTED SEP 14 1971  3,604,768

INVENTOR
JACOB DECKER

BY Frank C. Leach Jr.

ATTORNEY

BEARING SHOE CONSTRUCTION

To be correctly positioned on a spindle, the bearing shoes for the rotating spindle must have the axes of the highest points of the arcs of the spindle contacting surfaces parallel to each other and to the axis of rotation of the spindle. If these axes are not parallel to each other, the bearing shoes cease to function correctly so as to lose their desired rigidity. Additionally, when the axes are not parallel to each other, there is an increase in generated heat.

Since the optimum design of a bearing shoe determines its wrap angle on the spindle, there are numerous instances in which the bearing shoes will have a relatively small wrap angle. As a result of the small wrap angle, it is difficult, if not impossible, to install each of the bearing shoes during assembly so that the axis at the highest point of the arc of the spindle-contacting surface of the bearing shoe is parallel to the rotating axis of the spindle and all of the other axes of the highest points of the arcs of the spindle-contacting surfaces of the other bearing shoes forming the shoe bearing. When one of the bearing shoes is assembled incorrectly, there is no restoring force during rotation of the spindle to return the bearing shoe to its proper position on the spindle. As a result, the bearing shoe fails to function properly whereby the previously mentioned loss of rigidity and increase in heat occur.

The present invention satisfactorily overcomes the foregoing problem by positioning the bearing shoes properly during assembly while each of the bearing shoes is formed with the desired small wrap angle that produces the optimum design of the particular bearing shoe. Thus, when using the bearing shoe construction of the present invention, the axes of the highest points of the arcs across the spindle-contacting surfaces of the bearing shoes are parallel to each other and to the rotating axis of the spindle.

In the present invention, at least two bearing shoes are connected to each other so that their total wrap angle will preferably be greater than 90°. As a result of this relatively large wrap angle, the radius of curvature of the spindle is such that this large wrap angle insures that the bearing shoes are properly mounted during assembly. The connecting means between the bearing shoes is selected so that each of the bearing shoes can rock relative to the other during rotation of the spindle. Thus, this bearing shoe construction allows each of the bearing shoes to function as a separate bearing shoe during rotation of the spindle while having the bearing shoes connected to each other during assembly to take advantage of the large wrap angle produced thereby.

An object of this invention is to provide an assembly for aligning bearing shoes of relatively small wrap angles on a spindle.

Another object of this invention is to provide a bearing shoe construction having a large wrap angle in which each bearing shoe has a relatively small wrap angle.

Other objects of this invention will be readily perceived from the following description, claims, and drawing.

This invention relates to a bearing shoe construction including at least two bearing shoes for cooperation with a spindle rotatably mounted in a housing or the like. Means secure the bearing shoes to each other with the longitudinal axes of the bearing shoes parallel to each other and to the axis of the spindle with the securing means permitting either of the bearing shoes to rock relative to the other and to the spindle. Means fixes at lest one of the bearing shoes to the housing.

The attached drawing illustrates preferred embodiments of the invention, in which.

Figure 1:
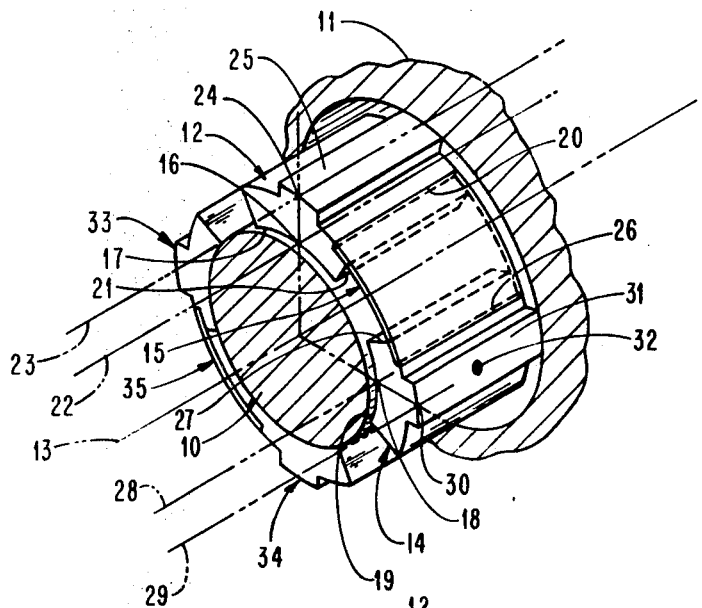
FIG. 1 is a perspective view of one form of the bearing shoe construction of the present invention disposed on a spindle.

Referring to the drawing and particularly FIG. 1, there is shown a spindle 10, which is rotatably mounted within a housing 11 for rotation about its axis 13. The bearing shoe construction includes two bearing shoes 12 and 14, which have relatively small wrap angles such as 40°, for example.

The bearing shoes 12 and 14 are connected to each other by a thin, flat member 15 having sufficient resiliency to permit each of the bearing shoes 12 and 14 to rock relative to the spindle 10 and to the other bearing shoe. One suitable example of the thin, flat member 15 is a flat piece of spring steel having a thickness in the range of 0.005 inches to 0.008 inches.

The thin, flat member 15 extends for the length of each of the bearing shoes 12 and 14. The width of the thin, flat member 15 is selected so that the angular distance between highest point 16 of the arc on inner surface 17, which contacts the spindle 10 of the bearing shoe 12, and highest point 18 of the arc of inner surface 19, which contacts the spindle 10 of the bearing shoe 14, is 90° when four bearing shoes are employed to support the spindle 10 within the housing 11. An oil film is generated between each of the bearing shoes 12 and 14 and the spindle 10 during rotation in the well-known manner.

When the bearing shoe 12 is formed by machining, a retaining surface 20 of the bearing shoe 12 is machined at the same time as surface 21 of the bearing shoe 12. This insures that the surfaces 20 and 21 are parallel to each other and to axes 22 and 23 of the bearing shoe 12.

The axis 22, which is parallel to the spindle axis 13, represents the continuation of the highest point 16 of the arc of the spindle-contacting surface 17 of the bearing shoe 12. The axis 23 represents the continuation of highest point 24 of the arc of outer arcuate surface 25 of the bearing shoe 12. The surface 25 is parallel to the spindle-contacting surface 17 and also must be parallel with the axis 13 of the spindle 10.

When forming the bearing shoe 14, a retaining surface 26 is machined at the same time as a surface 27 of the bearing shoe 14. This insures that the surfaces 26 and 27 of the bearing shoe 14 are parallel to each other. The radius of the bearing shoe 14 is referenced in machining to the previously machined surface 27 to thereby insure parallelism of the surface 27 with axes 28 and 29 of the bearing shoe 14.

The axis 28 is a continuation of the highest point 18 of the arc of the spindle-contacting surface 19 of the bearing shoe 14. The axis 29 represents the continuation of highest point 30 of the arc of outer arcuate surface 31 of the bearing shoe 14. The surface 31 is parallel to the spindle-contacting surface 19 and to the spindle axis 13.

In machining the retaining surface 20 of the bearing shoe 12, a step is formed on the bearing shoe 12 and on which a portion of the thin, flat member 15 rests. Likewise, in machining the retaining surface 26 of the bearing shoe 14, a step is formed on the bearing shoe 14 and on which a portion of the thin, flat member 15 rests.

The thin, flat member 15 has its opposite ends or sides, which abut against the retaining surfaces 20 and 26, parallel to each other. The thin, flat member 15 has its portions, which rest on the steps or lands of the bearing shoes 12 and 14, secured thereto by suitable means such as cementing with an epoxy, for example.

Since the two bearing shoes 12 and 14 are connected to each other by the thin, flat member 15, it is only necessary to fix one of the bearing shoes 12 and 14 to the housing 11 to prevent rotation of the bearing shoes 12 and 14 owing to rotation of the spindle 10. Of course, if desired, both of the bearing shoes 12 and 14 could be fixed to the housing 11.

Since the spindle 10 is assumed to rotate counterclockwise in FIG. 1, the bearing shoe 14 must be fixed to the housing 11 to avoid any possibility of compressing the thin, flat member 15 and causing it to collapse as would be possible if only the bearing shoe 12 were fixed to the housing 11. Accordingly, a pin 31 fixes the bearing shoe 14 to the housing 11 in the well-known manner.

By forming the connecting member 15 sufficiently thin, the member 15 is capable of bending so as to not hinder the rocking motion of either of the bearing shoes 12 and 14 when the spindle 10 is rotating. Thus, either of the bearing shoes 12 and 14 may rock relative to the other and to the spindle 10 without damaging the connecting member 15.

The spindle 10 has a second set of bearing shoes 33 and 34 mounted thereon when a four bearing shoe configuration is employed to support the spindle 10 within the housing 11 as shown in FIG. 1. The bearing shoes 33 and 34 are connected by a thin, flat member 35 similar to the member 15. The bearing shoe 33 is fixed to the housing 11 by a pin (not shown), which is diametrically disposed to the pin 32, in the same manner as the bearing shoe 14 is fixed to the housing 11.

Figure 2:
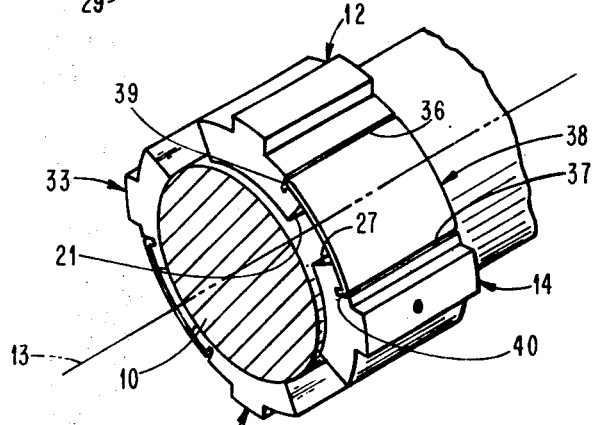
FIG. 2 is a perspective view of another form of bearing shoe construction of the present invention.

Referring to FIG. 2, there is shown a modification of the present invention in which the bearing shoes 12 and 14 have grooves 36 and 37, respectively, milled therein. The groove 36 is formed parallel to the surface 21 of the bearing shoe 12, and the groove 37 is formed parallel to the surface 27 of the bearing shoe 14.

A thin, flat connecting member 38, which is preferably formed of the same material as the member 15, had one end or side 39 disposed in the groove 36 and its other end or side 40 disposed in the groove 37. The ends or sides 39 and 40 are forced into the grooves 36 and 37, respectively, to insure that the thin, flat member 38 is secured to each of the bearing shoes 12 and 14.

The bearing shoes 33 and 34 are similarly connected to each other. Thus, the bearing shoes 33 and 34 may rock relative to each other.

Figure 3:
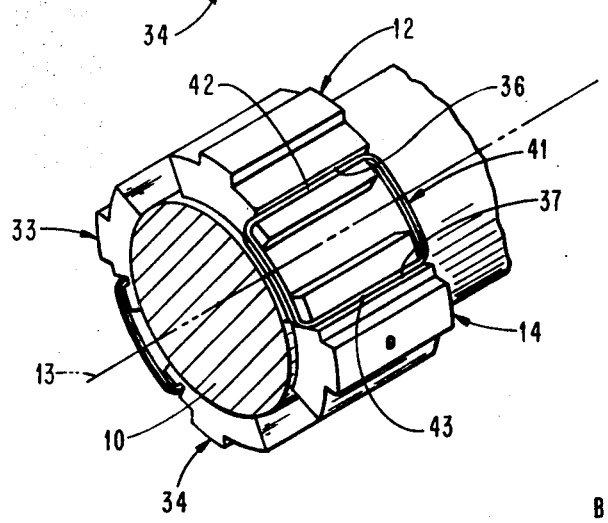
FIG. 3 is a perspective view of a further modification of the bearing shoe construction of the present invention.

Referring to FIG. 3, there is shown another embodiment of the present invention in which the bearing shoes 12 and 14 have the grooves 36 and 37 therein. However, instead of utilizing the thin, flat member 38, a resilient wire 41, which has a rectangular configuration, connects the shoe bearings 12 and 14 to each other. One side 42 of the wire 41 is disposed in the groove 36 in the bearing shoe 12. The wire 41 has its opposite side 43 disposed in the groove 37 in the shoe bearing 14.

The wire 41 is retained within each of the grooves 36 and 37 by forcing a portion of the metal adjacent the groove over the wire 41. This can be accomplished by staking.

The wire 42 has sufficient flexibility to allow either of the bearing shoes 12 and 14 to rock relative to the other and to the spindle 10. However, the axes 22, 23, 28, and 29 are maintained parallel to each other and to the rotating axis of the spindle 10 during assembly by the wire 41 of the bearing shoes 12 and 14 on the spindle 10.

The bearing shoes 33 and 34 are similarly connected to each other. Thus, the bearing shoes 33 and 34 may rock relative to each other.

While the present invention has shown and described two of the bearing shoes connected to each other, it should be understood that the bearing shoe construction of the present invention could have more than two of the bearing shoes connected to each other. For example, all four shoes in the four shoe configuration could be connected to each other by three of the thin, flat members 15, three of the thin, flat members 38, or three of the wires 41. It is necessary to not connect all of the bearing shoes to permit assembly on the spindle because of variation in dimensions of parts in the unit. In this arrangement, only one of the bearing shoes would have to be fixed to the housing 11.

An advantage of this invention is that it insures axial alignment of bearing shoes, which have relatively small wrap angles, on a spindle during assembly. Another advantage of this invention is that it increases the wrap angle of connected bearing shoes to greater than the total wrap angle of two connected bearing shoes. A further advantage of this invention is that it maintains the rigidity of bearing shoes for supporting a rotating spindle by obtaining exact alignment of the shoes.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:
1. A bearing shoe construction including:
   at least two bearing shoes for cooperation with a spindle rotatably mounted in a housing or the like;
   means to secure said bearing shoes to each other;
   the total number of said securing means being one less than the total number of said bearing shoes that are secured to each other by said securing means;
   each of said securing means being separate from any other of said securing means;
   each of said securing means securing an adjacent pair of said bearing shoes to each other;
   said securing means securing said bearing shoes to each other with the longitudinal axes of said bearing shoes parallel to each other and to the axis of a spindle with which said bearing shoes cooperate;
   means to fix at least one of said bearing shoes to a housing in which said bearing shoes are to be mounted;
   and said securing means permitting each of said bearing shoes to rock relative to any other of said bearing shoes secured thereto and to the spindle with which said bearing shoes cooperate.

2. The bearing shoe construction according to claim 1 in which said fixing means fixes at least said bearing shoe that is first passed by the spindle with which said bearing shoes cooperate during its rotation.

3. The bearing shoe construction according to claim 1 in which said securing means is a flexible sheet of metal.

4. The bearing shoe construction according to claim 1 in which:
   each of said bearing shoes has a wrap angle of less than 90°;
   and said securing means increases the total wrap angle of said adjacent connected bearing shoes to greater than 90°.

5. The bearing shoe construction according to claim 1 in which:
   each of said bearing shoes has a surface for contacting the spindle with which said bearing shoes cooperate;
   each of said bearing shoes has a retaining surface formed therein and parallel to the axis of the spindle contacting surface of each of said bearing shoes at its highest point;
   and said securing means engages each of said retaining surfaces to position said bearing shoes with the longitudinal axes of said bearing shoes parallel to each other.

6. The bearing shoe construction according to claim 5 in which said securing means is a flexible sheet of metal.

7. The bearing shoe construction according to claim 1 in which:
   each of said bearing shoes has a surface for contacting the spindle with which said bearing shoes cooperate;
   each of said bearing shoes has a groove formed therein and parallel to the axis of the spindle-contacting surface of each of said bearing shoes at its highest point;
   and said securing means has means disposed in each of said grooves.

8. The bearing shoe construction according to claim 7 in which said securing means is a flexible sheet of metal having opposite ends disposed in said grooves.

9. The bearing shoe construction according to claim 7 in which said securing means comprises a continuous wire having a rectangular configuration with opposite sides of said wire disposed in said grooves.